US012798008B2

(12) United States Patent
Imai et al.

(10) Patent No.: US 12,798,008 B2
(45) Date of Patent: Nov. 17, 2026

(54) LASER PROCESSING DEVICE

(71) Applicant: Sodick Co., Ltd., Yokohama (JP)

(72) Inventors: Tetsuya Imai, Yokohama (JP); Takeshi Jin, Yokohama (JP)

(73) Assignee: Sodick Co., Ltd., Yokohama (JP)

( * ) Notice: Subject to any disclaimer, the term of this patent is extended or adjusted under 35 U.S.C. 154(b) by 917 days.

(21) Appl. No.: 18/184,097

(22) Filed: Mar. 15, 2023

(65) Prior Publication Data

US 2023/0302579 A1 Sep. 28, 2023

(30) Foreign Application Priority Data

Mar. 22, 2022 (JP) ................................ 2022-044922

(51) Int. Cl.

*B23K 26/361* (2014.01)
*B23K 26/03* (2006.01)
*B23K 26/0622* (2014.01)
*B23K 26/073* (2006.01)
(Continued)

(52) U.S. Cl.

CPC .......... *B23K 26/361* (2015.10); *B23K 26/032* (2013.01); *B23K 26/0624* (2015.10); *B23K 26/073* (2013.01); *G06T 7/0006* (2013.01); *G06T 7/50* (2017.01); *G06T 2207/30164* (2013.01); *G06T 2207/30242* (2013.01)

(58) Field of Classification Search

CPC .. B23K 26/032; B23K 26/361; B23K 26/352; B23K 26/0624; B23K 26/0665; B23K 26/0626

See application file for complete search history.

(56) References Cited

U.S. PATENT DOCUMENTS 4,986,664 A * 1/1991 Lovoi .................. B23K 26/032
219/121.68
5,841,099 A 11/1998 Owen et al.
(Continued)

FOREIGN PATENT DOCUMENTS

CN 1213997 A 4/1999
CN 101248374 A 8/2008
(Continued)

OTHER PUBLICATIONS

Translation of CN109773340, retrieved Mar. 27, 2026.*
(Continued)

*Primary Examiner* — Courtney D Heinle
*Assistant Examiner* — Cameron A Corday
(74) *Attorney, Agent, or Firm* — Maier & Maier, PLLC

(57) ABSTRACT

A laser processing device, including: an irradiation device, and a control device. The irradiation device is configured to process one or more target layers sequentially from the workpiece by irradiating the target layers with a pulse laser beam having a pulse width of less than 10 picoseconds at a predetermined low fluence, and to removing a protrusion generated on a surface of the target layers by irradiation with the pulse laser beam at a high fluence higher than the low fluence. The control device includes a switching unit and a switching condition setting unit. The switching unit switches the pulse laser beam output from said irradiation device between the low fluence and the high fluence based on switching conditions.

11 Claims, 9 Drawing Sheets

(51) Int. Cl.
*G06T 7/00* (2017.01)
*G06T 7/50* (2017.01)

(56) References Cited

U.S. PATENT DOCUMENTS

| | | | | |
|---|---|---|---|---|
| 5,953,578 | A * | 9/1999 | Lee | H10P 74/23 438/690 |
| 7,525,065 | B2 * | 4/2009 | Engler | B23K 26/361 219/121.69 |
| 7,633,033 | B2 * | 12/2009 | Thomas | B23K 26/082 219/121.81 |
| 7,767,928 | B2 * | 8/2010 | Kuhl | B23K 26/361 219/121.69 |
| 9,579,749 | B2 * | 2/2017 | Hammann | B23K 26/38 |
| 9,784,562 | B2 * | 10/2017 | Lessmueller | G01B 9/02091 |
| 2010/0219542 | A1 * | 9/2010 | Tsujikawa | B23K 26/0624 264/1.37 |
| 2014/0011338 | A1 * | 1/2014 | Lei | H10P 54/00 219/121.67 |
| 2020/0078884 | A1 * | 3/2020 | Nie | B23K 26/3576 |
| 2021/0260842 | A1 | 8/2021 | Von Wallfeld et al. | |

FOREIGN PATENT DOCUMENTS

| | | | |
|---|---|---|---|
| CN | 109773340 | A * | 5/2019 |
| CN | 110385521 | A | 10/2019 |
| JP | 2007237210 | A | 9/2007 |
| JP | 2011245492 | A | 12/2011 |
| JP | 2014191051 | A | 10/2014 |
| JP | 2018065147 | A | 4/2018 |
| JP | 6340459 | B1 | 6/2018 |
| JP | 2019042763 | A | 3/2019 |
| JP | 2020514075 | A | 5/2020 |
| JP | 2022032620 | A | 2/2022 |

OTHER PUBLICATIONS

Office Action issued on May 30, 2025, in corresponding Chinese Application No. 202310261329.2, 16 pages.

Villerius et al., “Ultrashort pulsed laser ablation of stainless steels”, International Journal of Machine Tools and Manufacture, 2019, vol. 138, pp. 27-35.

European Search Report issued on Sep. 21, 2023, in corresponding European Application No. 23161525.3, 7 pages.

Office Action issued on Jun. 6, 2023, in corresponding Japanese Application No. 2022-044922, 9 pages.

* cited by examiner

LASER PROCESSING DEVICE

TECHNICAL FIELD

The present invention relates to a laser processing device.

BACKGROUND

When a workpiece is irradiated with an ultrashort pulse laser having a pulse width on the order of equal to or less than a single picosecond, a material in an irradiated portion is non-thermally dispersed and removed (ablation). Ultrashort pulse laser processing utilizing such a phenomenon enables fine processing in an atom-sized order and also enables high-quality processing of a variety of materials because its thermal influence on the surrounding area of the irradiated portion is small. Patent Literature 1 discloses a method for manufacturing a diamond die for a wire electrode used in wire electrical discharge machining, which enables the formation of a die hole with high surface precision in a short time by processing using a femtosecond laser.

PATENT LITERATURE

[Patent Literature 1] JP-B-6340459

SUMMARY

When a portion of the workpiece is divided into a plurality of target layers having a predetermined removal amount, and the target layers are sequentially processed by the irradiation with an ultrashort pulse laser, a protrusion having a substantially elliptical cross section may be generated on the surface of the target layers during processing. The generation of such protrusions has been observed in a variety of materials including metals and resins. Furthermore, once the protrusion is generated, the protrusion grows as the processing of the target layers progresses. Thus, this may cause a decrease in processing quality, especially in the processing of a relatively deep bottomed hole and the like.

It is possible to suppress the generation of the protrusion by irradiating ultrashort pulse laser at a high fluence much higher than a lower limit of fluence required for target layers (the lower limit is also referred to as a "laser ablation threshold value"). However, processing at such a high fluence may increase a thermal effect on the material and may reduce a surface precision of the processed surface.

The present invention has been made in view of such circumstances, and an object of the present invention is to provide a laser processing device that enables more precise processing using an ultrashort pulse laser.

According to the present invention, provided is a laser processing device comprising: an irradiation device; and a control device, wherein the irradiation device is configured to sequentially process one or more target layers in a workpiece by irradiating the target layers with a pulse laser beam having a pulse width of less than 10 picoseconds at a predetermined low fluence; and to remove a protrusion generated on a surface of the target layers by irradiating the protrusion with the pulse laser beam at a high fluence higher than the low fluence, the control device includes a switching unit and a switching condition setting unit, the switching unit switches fluence of the pulse laser beam from the irradiation device between the low fluence and the high fluence based on a switching condition, the switching condition setting unit sets the switching condition based on condition of the workpiece.

The laser processing device of the present invention is configured to switch the fluence of the pulse laser beam between the low fluence and the high fluence based on the switching condition. When the protrusion is generated on the surface of the target layers, the protrusion can be removed by switching to the high fluence and irradiating the protrusion. After the protrusion is removed, the fluence is switched to the low fluence and the target layers continue to be processed at the low fluence. This can minimize the processing at the high fluence and reduce degradation of the precision of the processed surface due to the thermal effect.

Hereinafter, various embodiments of the present invention will be exemplified. The embodiments described below can be combined with each other.

Preferably, the laser processing device, further comprises: an imaging device configured to acquire an image of the target layers; and an image processing device configured to analyze the image to detect the protrusion on the surface of the target layers, wherein the switching unit switches the pulse laser beam between the low fluence and the high fluence based on a detection result of the protrusion.

Preferably, the image processing device analyzes the image to acquire area or the number of the protrusion on the surface of the target layers.

Preferably, the switching condition setting unit sets the number of target layers to be processed at the low fluence and the number of target layers to be processed at the high fluence as the switching condition, and the switching unit switches the pulse laser beam from the low fluence to the high fluence based on the number of the target layers to be processed at the low fluence, and switches the pulse laser beam from the high fluence to the low fluence based on the number of the target layers to be processed at the high fluence.

Preferably, the switching condition setting unit sets a low fluence processing depth and a high fluence processing depth as the switching condition, and the switching unit switches the pulse laser beam from the low fluence to the high fluence based on the low fluence processing depth and switches the pulse laser beam from the high fluence to the low fluence based on the high fluence processing depth.

Preferably, the irradiation device is configured to perform irradiation with the pulse laser beam at a first high fluence and at a second high fluence as the high fluence, the second high fluence being lower than the first high fluence, and the switching unit is configured to switch the fluence of the pulse laser beam from the irradiation device between the low fluence, the first high fluence, and the second high fluence based on the switching condition.

Preferably, the control device includes a fluence setting unit, the fluence setting unit sets each value of the high fluence and the low fluence based on a processing condition, and the processing condition includes material of the workpiece.

Preferably, the processing condition further includes a scanning speed and a repetition frequency of the pulse laser beam.

Preferably, each of the target layers includes a first region and a second region, the first region being a region adjacent to an edge of the each of the target layers, the second region being a different region from the first region, a spot diameter of the pulse laser beam applied to the first region is smaller than a spot diameter of the pulse laser beam applied to the second region, and the pulse laser beam applied to the first region and the pulse laser beam applied to the second region are set to have equal fluence.

Preferably, the target layers are formed of alloy steel containing an inclusion in a base material, and the high fluence is equal to or greater than a laser ablation threshold value of the inclusion.

Preferably, the irradiation device includes a laser oscillator, and the laser processing device is configured to switch the fluence of the pulse laser beam between the low fluence and the high fluence by changing output pulse energy of the laser oscillator.

Preferably, the laser processing device is configured to switch the fluence of the pulse laser beam between the low fluence and the high fluence by changing a spot diameter of the pulse laser beam.

DETAILED DESCRIPTION

Hereinafter, the embodiments of the present invention will be described with reference to the drawings. The characteristic matters shown in the embodiments described below can be combined with each other. Moreover, each characteristic matter independently constitutes an invention.

I. Laser Processing Device 1

Figure 1:
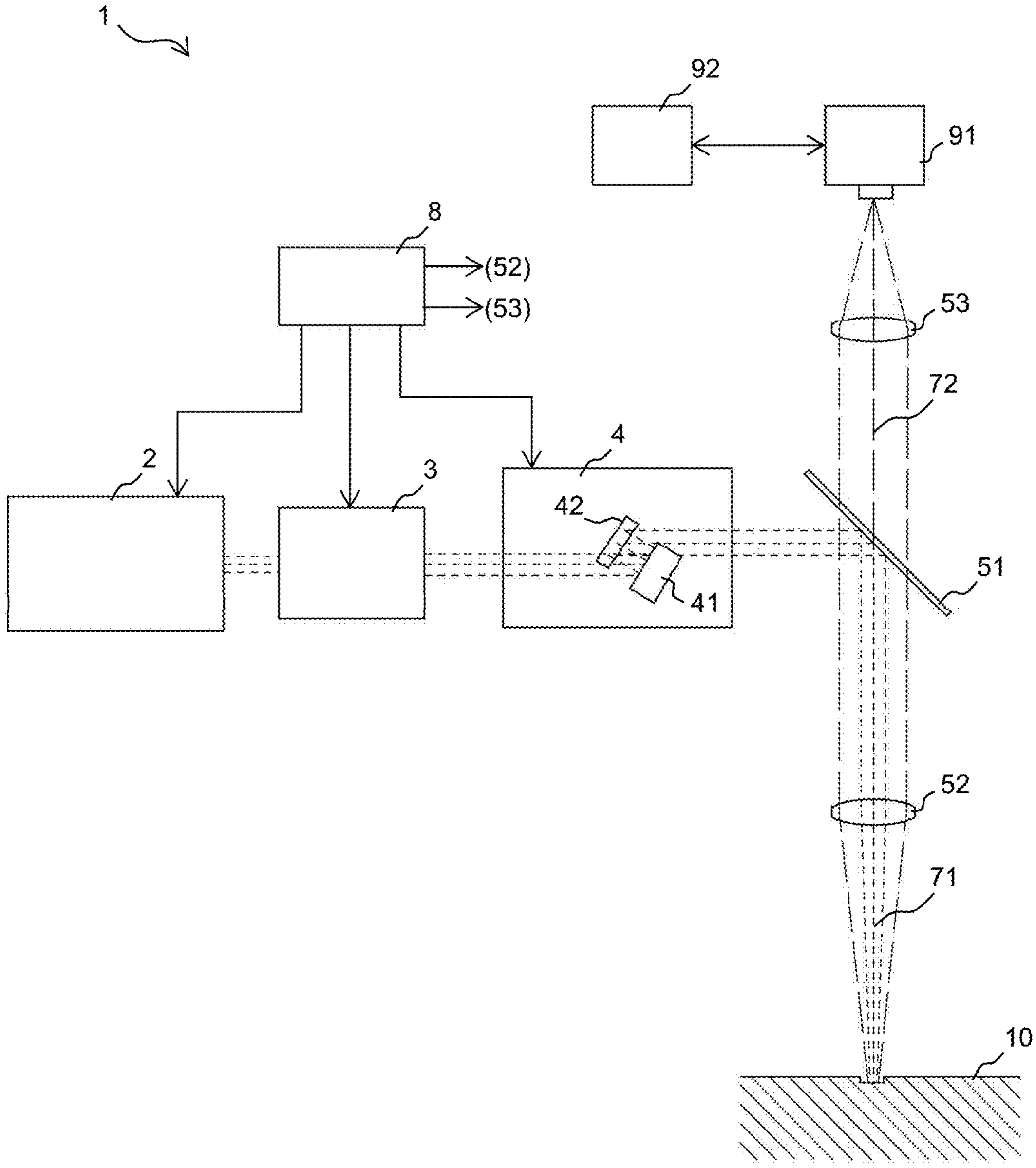
FIG. 1 is a schematic configuration diagram of a laser processing device 1 according to an embodiment of the present invention.

As shown in FIG. 1, a laser processing device 1 of this embodiment irradiates a workpiece 10 with a pulse laser beam 71 having a pulse width of less than 10 picoseconds and processes the workpiece 10 into a desired shape by dispersing the material at the irradiated point. The laser processing device 1 incudes a laser oscillator 2, an optical system 3, a scanning device 4, a beam splitter 51, a condensing lens 52, an imaging lens 53, an imaging device 91, an image processing device 92, and a control device 8.

The laser oscillator 2 converts a laser beam oscillated from a laser source (not shown) into the pulse laser beam 71 having a pulse width of less than 10 picoseconds and outputs it after adjusting its pulse energy into a predetermined value. In this regard, the pulse width refers to the time width per pulse of the pulse laser beam 71. The optical system 3 adjusts a beam diameter of the pulse laser beam 71 output from the laser oscillator 2 by means of a built-in lens (not shown). The optical system 3 can be configured using, for example, a beam expander.

In the processing using the pulse laser beam 71, a target portion of the workpiece 10 is divided into one or more target layers along its depth direction, and the target layers are processed sequentially from a top surface side to process the workpiece 10 into the desired shape. The scanning device 4 two-dimensionally scans the pulse laser beam 71 on each target layer of the workpiece 10. The scanning device 4 includes a first galvanometer mirror 41, a second galvanometer mirror 42, and actuators (not shown) that control the operation of the galvanometer mirrors 41, 42, respectively. The pulse laser beam 71 output from the optical system 3 is scanned in a first direction, which is a horizontal one-axis direction, by being reflected by the first galvanometer mirror 41, and is scanned in a second direction, which is another horizontal one-axis direction orthogonal to the first direction, by being reflected by the second galvanometer mirror 42. Consequently, a predetermined point of the target layer is irradiated with the pulse laser beam 71, and the material at the irradiated point is removed. In this regard, the scanning system of the pulse laser beam 71 by the scanning device 4 is not limited to the galvanometer scanning system described above. For example, another available scanning system may be configured to drive the table on which the workpiece 10 is placed and to scan the pulse laser beam 71 against the workpiece 10 moving with the table, and yet another available scanning system may scan the pulse laser beam 71 against the workpiece 10 by driving the laser oscillator 2.

The beam splitter 51 is configured to reflect the pulse laser beam 71 output from the scanning device 4 and to transmit reflected light 72 from the workpiece 10. The beam splitter 51 is positioned along an optical path of the pulse laser beam 71 output from the scanning device 4, between the condensing lens 52 and the imaging lens 53 along the vertical direction. As a result, the pulse laser beam 71 output from the scanning device 4 is reflected by the beam splitter 51 and is applied to the workpiece 10 through the condensing lens 52. The reflected light 72 from the workpiece 10 passes through the beam splitter 51 and reaches the imaging device 91 via the imaging lens 53.

The condensing lens 52 is positioned below the beam splitter 51, and the condensing lens 52 adjusts the beam diameter of the pulse laser beam 71 output from the scanning device 4. The condensing lens 52 can be configured using an objective lens. The beam diameter is adjusted by the optical system 3 and the condensing lens 52, so that it becomes possible to irradiate the target layers with the pulse laser beam 71 with a predetermined spot diameter (the beam diameter of the pulse laser beam 71 at the irradiated point on the target layers). The imaging lens 53 is positioned above the beam splitter 51 and focuses the reflected light 72 from the workpiece 10 to form an image on the imaging device 91.

In addition, a beam splitting element (not shown) may be further disposed between the beam splitter 51 and the condensing lens 52 or below the condensing lens 52 to split the pulse laser beam 71 into a plurality of sub-beams. The use of the beam splitting element reduces the total processing time for processing a plurality of predetermined shapes.

The imaging device 91 acquires images of the target layers of the workpiece 10. The imaging device 91 is positioned above the condensing lens 52, thereby acquiring images of the target layers viewed from above. The imaging device 91 may be configured with, for example, a CMOS camera or a CCD camera. In addition, an illumination device such as an LED light may be used as needed to illuminate the workpiece 10 during imaging by the imaging device 91.

The image processing device 92 analyzes the image of the target layers acquired by the imaging device 91 to detect protrusions 20 on a surface of the target layers. In this embodiment, the image processing device 92 is configured to analyze the image so as to calculate the number of the protrusions 20 or area thereof on the surface of the target layers. Specifically, after making appropriate corrections to the image acquired by the imaging device 91, a binarization process is performed to distinguish the portion on the surface of the target layers where the protrusions 20 are present from the other portion (i.e., in the other portion, the protrusions 20 are not present, and the surface of the target layers itself is exposed). Normally, on the surface of the target layers, the portion where the protrusions 20 are present appears brighter in the image than the other portion. Using this difference in brightness in the image, the binarization process distinguishes the portion with protrusions 20 from the other portion on the surface of the target layers.

The binarization process is preferably performed on a pixel-by-pixel basis in the image, or on a cell-by-cell basis in which the image is divided into a grid. For example, the binarization process is performed on a pixel-by-pixel basis in the image, and the areas where the protrusions 20 are present are labeled as white and the other areas as black. Then, the pixels that are labeled white and have outer edges at least partially overlapping each other are grouped to define one or more regions, and the number of such regions can be used as the number of protrusions 20. Alternatively, the number of pixels labeled white can be counted to multiply the counted number by the area of one pixel, and this multiplied value can be used as the area of the portion where the protrusion 20 is present on the surface of the target layers.

II. Control Device 8

Figure 2:
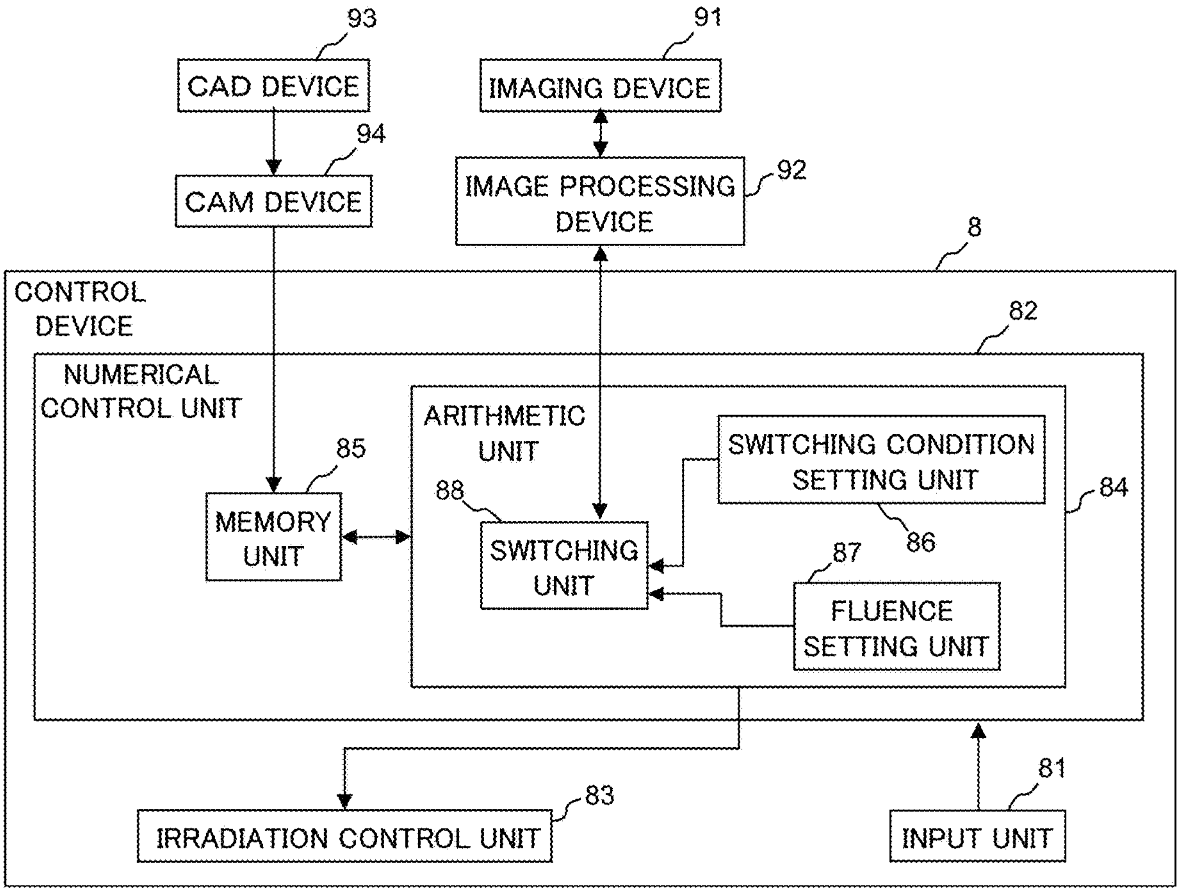
FIG. 2 is a schematic configuration diagram of a control device 8 of the laser processing device 1.
Figure 3A:
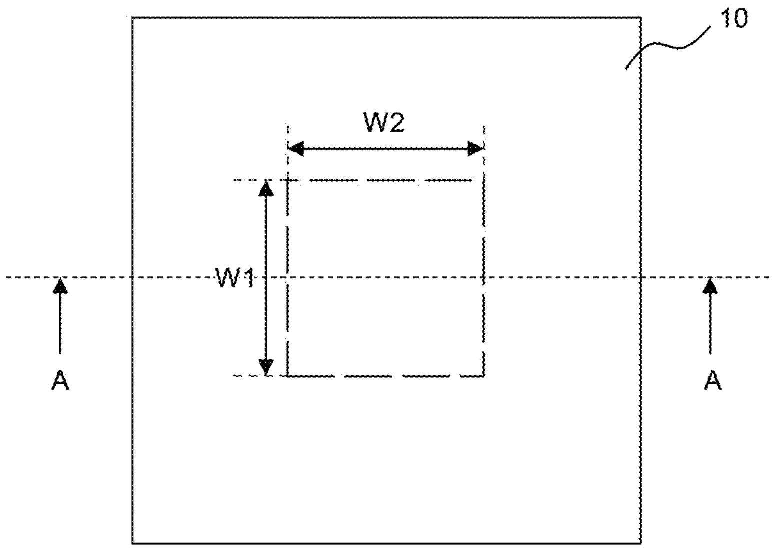
FIG. 3A is a plan view of a workpiece 10 to be processed by the laser processing device 1.
Figure 3B:
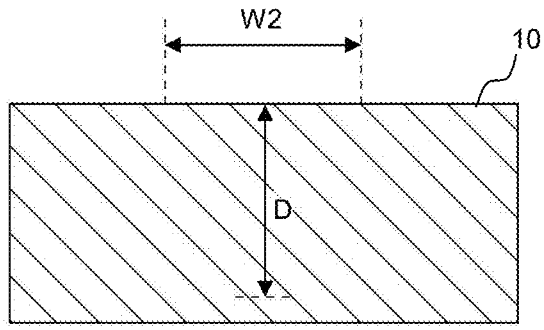
FIG. 3B is a cross-sectional view of the workpiece 10 taken along an A-A line in FIG. 3A.

The control device 8 is configured to control the above components of the laser processing device 1. The following description will focus on the control operations of the control device 8 that are relevant to the present invention. As illustrated in FIG. 2, the control device 8 includes an input unit 81, a numerical control unit 82, and an irradiation control unit 83.

In this regard, each of the following components may be realized by software or hardware. When realized by software, various functions can be realized by CPU executing computer programs. The program may be stored in a built-in memory or a non-transitory computer-readable storage medium. Alternatively, the above functions may be realized by reading the program stored in an external memory using so-called cloud computing. When realized by hardware, the above functions can be performed by various circuits such as ASIC (Application Specific Integrated Circuit), FPGA (Field Programmable Gate Array), or DRP (Dynamically Reconfigurable Processor). In this embodiment, various information and concepts including this information are dealt with. The information and concepts can be represented as a bit group of binary numbers having 0 or 1 according to the level of signal value, and communication and calculation can be executed according to configurations of the above software and hardware.

A CAD device 93 and a CAM device 94 are installed outside the control device 8. The CAD device 93 is configured to create three-dimensional shape data (CAD data) representing the processed shape and dimensions of the workpiece 10. The CAM device 94 is configured to create operation procedure data (CAM data) of the laser processing device 1 when processing the workpiece 10. The CAM data include, for example, data on irradiation positions of the pulse laser beam 71 on each of the target layers, and data on various settings related to the pulse laser beam 71.

The input unit 81 is a device for the operator to input information necessary for various processing in the numerical control unit 82, and can be configured by, for example, a touch panel, a keyboard, or a mouse. The input information includes, for example, material of the workpiece 10, a scanning speed of the pulse laser beam 71, a repetition frequency of the pulse laser beam 71 (the number of pulses generated per unit time), etc. The input information is sent to the numerical control unit 82.

The numerical control unit 82 generates operation commands for each component of the laser processing device 1 by processing the CAM data and the input information from the input unit 81 using a numerical control program. The numerical control unit 82 includes an arithmetic unit 84 and a memory unit 85.

The arithmetic unit 84 generates the operation commands for each component of the laser processing device 1 using the numerical control program stored in the memory unit 85. The arithmetic unit 84 includes a switching condition setting unit 86, a fluence setting unit 87, and a switching unit 88.

The switching condition setting unit 86 sets a switching condition for switching the fluence of the pulse laser beam 71 based on condition of the workpiece 10. In this embodiment, the pulse laser beam 71 at a relatively low fluence (a low fluence FL) is used when processing the target layers on the workpiece 10, and the pulse laser beam 71 at a higher fluence (a high fluence FH) than the low fluence FL is used when removing the protrusions 20 generated on the surface of the target layers. The "fluence" refers to the amount of energy per unit area at an irradiation spot of the pulse laser beam 71, and the "fluence" in the present invention refers to a fluence of the pulse laser beam 71 at an irradiation spot on the target layers. The switching condition setting unit 86 sets the condition for switching the fluence of the pulse laser beam 71 between the low fluence FL and the high fluence FH.

The condition of the workpiece 10 includes, for example, the material of the workpiece 10. In this embodiment, the switching condition setting unit 86 sets a threshold value for the number or the area of protrusions 20 generated on the surface of the target layers, based on the condition of the workpiece 10. For example, a relationship between the condition of the workpiece 10 and the threshold value is stored in the memory unit 85 as a database or a numerical control program, and the threshold value can be set by the switching condition setting unit 86 reading a corresponding value from the database or the numerical control program according to the information of the material of the workpiece 10 included in the input information.

The fluence setting unit 87 sets each value of the low fluence FL and the high fluence FH based on a processing condition. For example, the memory unit 85 may store a database or a numerical control program for optimal values of the low fluence FL and the high fluence FH corresponding to the processing condition, and the fluence setting unit 87 reads out a corresponding value according to the processing condition included in the input information, thereby setting each value of the low fluence FL and the high fluence FH. Alternatively, the memory unit 85 may store a function in which the processing condition is a variable and which calculates each value of the low fluence FL and the high fluence FH from the processing condition, and the fluence setting unit 87 may calculate and set the low fluence FL and the high fluence FH using this function. The details of setting the low fluence FL and the high fluence FH in the fluence setting unit 87 are described below.

The switching unit 88 switches the pulse laser beam 71 output from the irradiation device between low fluence FL and high fluence FH based on the switching conditions set by the switching condition setting unit 86. The switching unit 88 of this embodiment receives data indicating the number or the area of the protrusions 20 on the surface of the target layers from the image processing device 92, and compares the number or the area of the protrusions 20 with the threshold value set by the switching condition setting unit 86. When the switching unit 88 determines through the comparison that switching from the low fluence FL to the high fluence FH or from the high fluence FH to the low fluence FL is necessary, the switching unit 88 outputs an operation command to the irradiation control unit 83 to switch the fluence of the pulse laser beam 71. Specifically, based on specific values of the low fluence FL or the high fluence FH set by the fluence setting unit 87, the switching unit 88 generates an operation command using a numerical control program and outputs the operation command to the irradiation control unit 83 so that the fluence of the pulse laser beam 71 at an irradiation point becomes a predetermined value.

The memory unit 85 stores the CAM data, the input information sent from the input unit 81, the numerical control program, the database, and the function or the like used by the switching condition setting unit 86 and the fluence setting unit 87.

The irradiation control unit 83 controls each component of the laser processing device 1 according to the operation commands sent from the numerical control unit 82. When switching the pulse laser beam 71 between the low fluence FL and the high fluence FH, the pulse laser beam 71 can be adjusted to the desired fluence by controlling the laser oscillator 2 to change output pulse energy of the pulse laser beam 71, or by controlling the optical system 3 or the condensing lens 52 to change the spot diameter of the pulse laser beam 71.

III. Setting of Fluence

The fluence setting by the fluence setting unit 87 is described in more detail below. In this embodiment, the fluence setting unit 87 sets the values of the low fluence FL and the high fluence FH based on the predetermined processing condition. Examples of processing conditions include the material of the workpiece 10, the scanning speed of the pulse laser beam 71, and the repetition frequency of the pulse laser beam 71.

In this embodiment, the value of the low fluence FL is set to be equal to or greater than a laser ablation threshold value based on the material of the workpiece 10. The laser ablation threshold value is a lower limit on the fluence required to remove the material of the target layers. If the fluence is too low, the efficiency of processing the target layers will decrease, and if the fluence is too high, the quality of the processing will deteriorate. Specifically, if the fluence is too high, micropores will be formed on the processed surface due to thermal effect, resulting in an increase in surface roughness, changes in material properties such as hardness and material distortion will occur, and spatter (material particles scattered from the irradiation point of the pulse laser beam 71 or its surroundings) generated during irradiation of the pulse laser beam 71 will increase.

Further, it is preferable that the value of the low fluence FL be set in consideration of the scanning speed and the repetition frequency of the pulse laser beam 71. Specifically, when the value of the low fluence FL is set during processing with respect to spot spacing determined by the scanning speed and the repetition frequency of the pulse laser beam 71, it is preferable that a processing effect at the set value of the low fluence FL remain unchanged. For example, the value of the low fluence FL can be adjusted in such a manner that the value of the low fluence FL is set to be equal to or greater than the laser ablation threshold value of the material of the target layers, and in such a manner that the processing effect at the low fluence FL set during the processing does not change with respect to the spot spacing determined based on the scanning speed and the repetition frequency of the pulse laser beam 71. In this regard, the "processing effect" in the present invention refers to an energy consumption amount for processing per unit volume using the pulse laser beam 71 applied to a region on the target layers. In other words, the processing effect by the value of the low fluence FL refers to an energy consumption amount for processing per unit volume using the pulse laser beam 71 applied to a region on the target layers at the low fluence FL.

Each layer of the target layers is raster-scanned or vector-scanned with the pulse laser beam 71 at a predetermined spot spacing. Here, the "spot spacing" refers to a distance between centers of two adjacent irradiation spots along a scanning direction of the pulse laser beam 71 (the scanning direction is a direction of movement of the irradiation spots on the target layers). The spot spacing is determined by the scanning speed and the repetition frequency of the pulse laser beam 71. For example, the larger the repetition frequency and the slower the scanning speed, the smaller the spot spacing becomes and the larger an overlap area between adjacent irradiation spots becomes. In the overlap area between irradiation spots, the thermal effect on a layer irradiated with the pulse laser beam 71 and on the material beneath the irradiated layer is greater than the thermal effect in areas other than the overlap area, and thus the precision of the processed surface is likely to be degraded due to the thermal effect. In the above configuration, when the spot spacing is relatively small (i.e., the overlap area is large), the value of the low fluence FL can be set to a small value to suppress the thermal effect on the overlap area between the irradiation spots.

On the other hand, when the protrusions 20 are generated on the surface of the target layers as processing of the layers progresses, in many cases, it is difficult to remove the protrusions 20 by irradiation with the pulse laser beam 71 at the low fluence FL suitable for processing of the target layers. For example, in the workpiece 10 made of alloy steel, the protrusions 20 having an oval-shaped cross section are generated due to an inclusion contained in the alloy steel, i.e., a base material, but the laser ablation threshold value of the inclusion is much higher than the laser ablation threshold value of the alloy steel. This makes it difficult to remove the protrusions 20 by irradiation with the pulse laser beam 71 at the low fluence FL suitable for the target layers. Therefore, once the protrusions 20 are generated, the protrusions 20 grow in the depth direction as the target layers are sequentially processed. In this explanation, the "inclusion" refers to a minute amount of a non-metallic compound that is inevitably mixed into alloy steel during its manufacturing process and is difficult to remove. The inclusion in the alloy steel usually has a particle size of several μm to several tens of μm and is contained in an irregular distribution in the alloy steel, i.e., the base material. Examples of such inclusions may be an oxide inclusion such as $Al_2O_3$, MgO, and CaO, a sulfide inclusion such as MnS and CaS, or a nitride inclusion such as TiN and NbN.

The high fluence FH is set to a higher value than the low fluence FL in order to remove the protrusions 20 generated as described above. When the high fluence FH is a times higher than the low fluence FL (i.e., $FH=\alpha\times FL$), for example, $2\leq\alpha\leq 20$, specifically, for example, $\alpha=2$, 3, 4, 5, 6, 7, 8, 9, 10, 11, 12, 13, 14, 15, 16, 17, 18, 19, 20, and a maybe in the range between any two of the values illustrated here. In order to achieve both removal efficiency of protrusions 20 and suppression of the thermal effect on the material, it is preferable to set the high fluence FH to be $7\leq\alpha\leq 15$. When the material of the workpiece 10 is alloy steel, it is preferable that the high fluence FH be set equal to or greater than the laser ablation threshold value of the inclusion in order to efficiently remove the protrusions 20 originating from the inclusion. Furthermore, when the value of the high fluence FH is set during processing with respect to spot spacing determined by the scanning speed and repetition frequency of the pulse laser beam 71, it is preferable that a processing effect at the set value of the high fluence FH remain unchanged. In this regard, the processing effect by the value of the high fluence FH refers to an energy consumption amount for processing per unit volume using the pulse laser beam 71 applied to a region on the target layers at the high fluence FH.

IV. Processing Method of Workpiece 10

Referring to FIGS. 3A to 6, a processing method of the workpiece 10 using the laser processing device 1 of this embodiment will be described. As an example of the processing by the laser processing device 1, a case of forming a bottomed hole 10*a* on the workpiece 10 shown in FIG. 3A and FIG. 3B will be described. The workpiece 10 is made of alloy steel, and the bottomed hole 10*a* to be formed has a rectangular opening having the size of W1×W2 in a plan view and has a depth of D.

Figure 6:
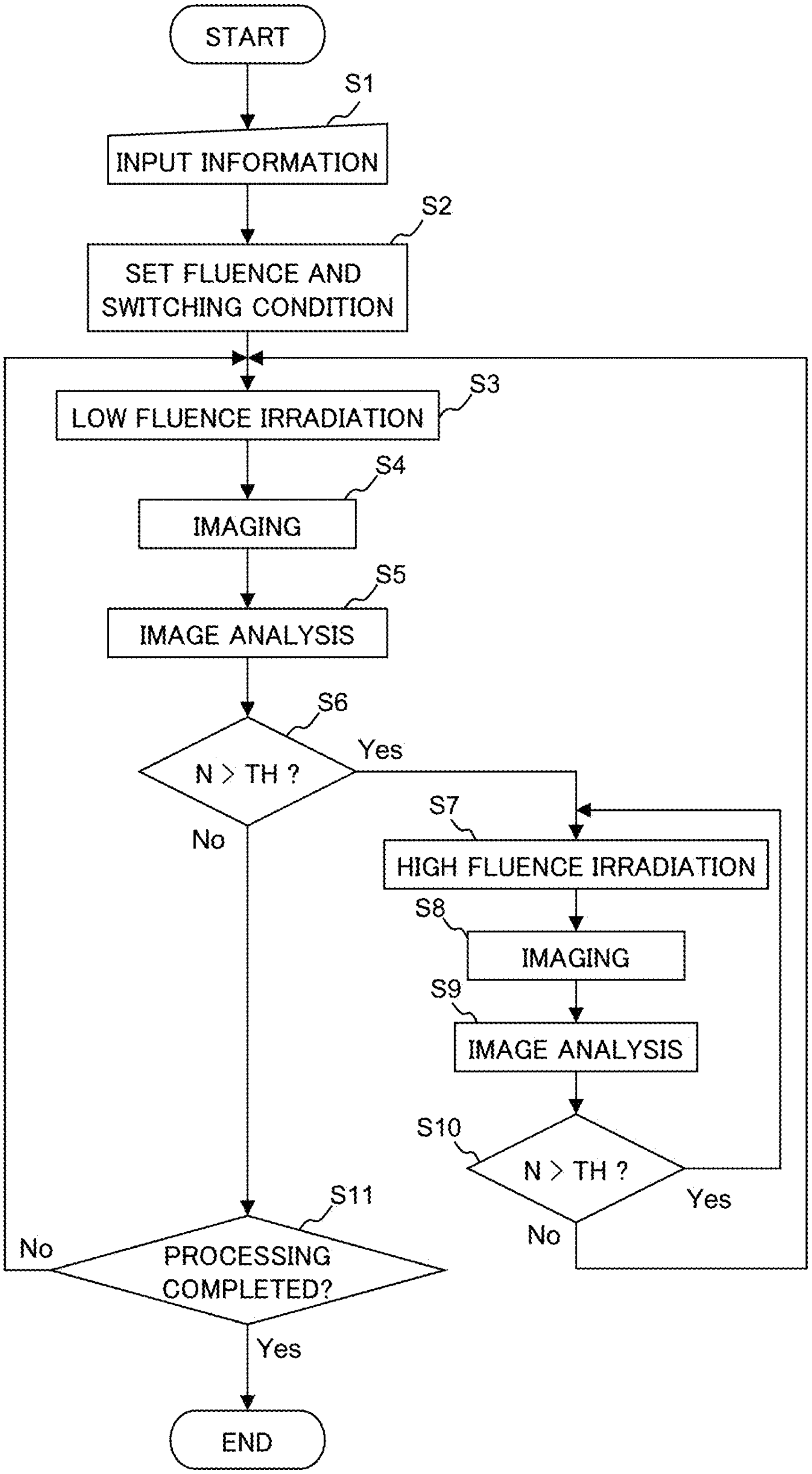
FIG. 6 is a flow diagram of a processing method using the laser processing device 1 of the embodiment of the present invention.

As shown in FIG. 6, prior to processing, an operator inputs conditions such as the material of the workpiece 10, the scanning speed of the pulse laser beam 71, and the repetition frequency of the pulse laser beam 71 into the input unit 81 (Step S1). The input unit 81 receives the input information and sends it to the numerical control unit 82. The fluence setting unit 87 sets the values of the low fluence FL and the high fluence FH based on the processing conditions. The switching condition setting unit 86 sets the switching condition of the fluence of the pulse laser beam 71 based on the condition of the workpiece 10 (Step S2). The numerical control unit 82 generates operation commands for each component of the laser processing device 1 and sends them to the irradiation control unit 83.

In this embodiment, the target portion is divided into n target layers $L_1$, $L_2$, $L_3$, . . . $L_n$ from the top surface side of the workpiece 10. In this regard, the thickness of each of the target layers $L_1$, $L_2$, $L_1$, . . . $L_n$ may be the same or different from each other.

Figure 4A:
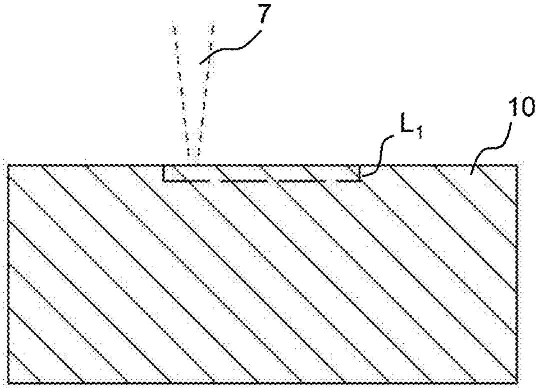
FIG. 4A is a cross-sectional view in which target layers of the workpiece 10 are processed by the laser processing device 1.
Figure 4B:
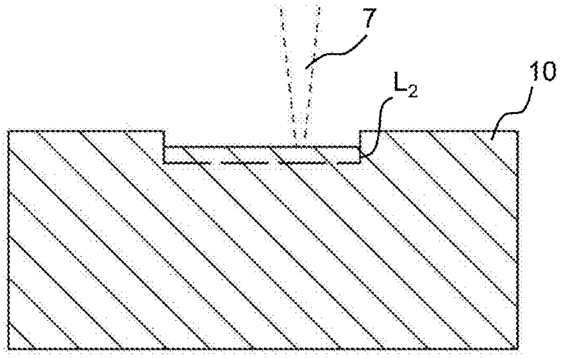
FIG. 4B is a cross-sectional view in which target layers of the workpiece 10 are processed by the laser processing device 1.

At the start of processing, the laser processing device 1 irradiates the workpiece 10 with the pulse laser beam 71 at the low fluence FL to sequentially process the target layers $L_1$, $L_2$, $L_3$, . . . (Step S3). Specifically, as shown in FIG. 4A, the first (top) target layer $L_1$ is irradiated with the pulse laser beam 71 at the low fluence FL to process the layer $L_1$. Next, as shown in FIG. 4B, the second target layer $L_2$ located directly below the layer $L_1$ is irradiated with the pulse laser beam 71 at the low fluence FL to process the layer $L_2$. The same operation is repeated for the third and subsequent target layers $L_3$, $L_4$ . . . to process the layers sequentially in the depth direction.

Next, the imaging device 91 acquires an image of the target layers on the workpiece 10 (Step S4). The image processing device 92 analyzes the acquired image to acquire a numerical value N representing the number of the protrusions 20 on the surface of the target layers (Step S5). In this regard, the image acquisition of the target layers by the imaging device 91 may be performed each time the processing of a predetermined number of target layers is completed, or each time the processing of a predetermined thickness of the target layers in the depth direction is completed, or each time the processing by irradiation at the low fluence FL progresses for a predetermined duration.

The switching unit 88 compares the number N of the protrusions 20 with a threshold value TH set by the switching condition setting unit 86 (Step S6). If the number N of the protrusions 20 is equal to or less than the threshold value TH, the switching unit 88 determines that switching to the high fluence FH is unnecessary, and processing of the target layers by irradiation at the low fluence FL is continued. If the number N of the protrusions 20 is greater than the threshold value TH, the switching unit 88 determines that switching to the high fluence FH is necessary, and outputs an operation command to the irradiation control unit 83 to switch the fluence of the pulse laser beam 71 to the high fluence FH.

Figure 5A:
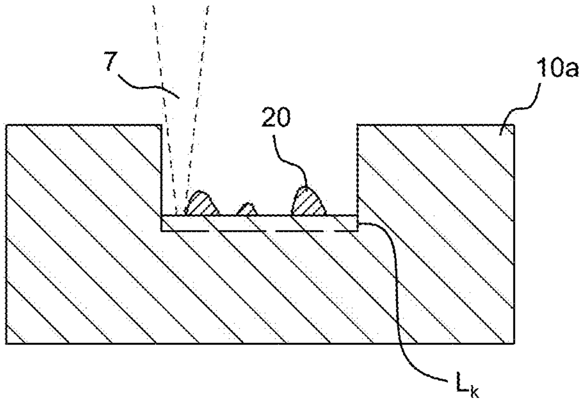
FIG. 5A is a cross-sectional view showing the removal of protrusions 20 on a target layer $L_k$ by the laser processing device 1.

After switching the fluence, the laser processing device 1 irradiates the protrusions 20 with the pulse laser beam 71 at the high fluence FH to remove the protrusions 20 generated on the surface of the target layers (Step S7). When the protrusions 20 are generated on a k-th target layer $L_k$ as shown in FIG. 5A, the target layer $L_k$ is irradiated with the pulse laser beam 71 at the high fluence FH. This causes the protrusions 20 to be removed along with the target layers.

Next, the imaging device 91 acquires an image of the target layers on the workpiece 10 (Step S8). The image processing device 92 analyzes the acquired image to acquire the number N of the protrusions 20 on the surface of the target layers (Step S9). In this regard, the image acquisition of the target layers by the imaging device 91 may be performed each time the processing of a predetermined number of target layers is completed, or each time the processing of a predetermined thickness of the target layers in the depth direction is completed, or each time the processing by irradiation at the high fluence FH progresses for a predetermined duration.

The switching unit 88 compares the number N of the protrusions 20 with the threshold value TH set by the switching condition setting unit 86 (Step S10). If the number N of the protrusions 20 is greater than the threshold value TH, the removal of the protrusions 20 by irradiation at the high fluence FH is continued. If the number N of the protrusions 20 is equal to or less than the threshold value TH, the switching unit 88 determines that switching to the low fluence FL is necessary, and outputs an operation command to the irradiation control unit 83 to switch the fluence of the pulse laser beam 71 to the low fluence FL.

Figure 5B:
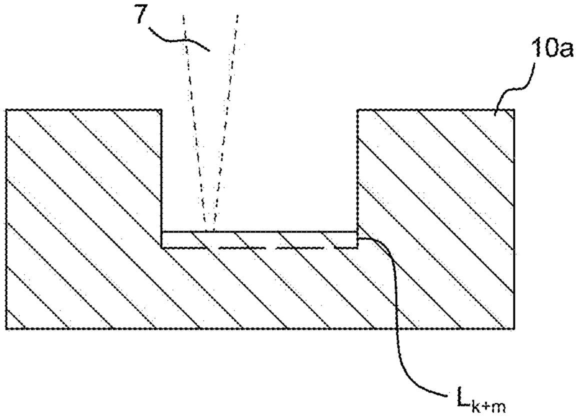
FIG. 5B is a cross-sectional view showing the removal of protrusions 20 on a target layer $L_k$ by the laser processing device 1.

Before the switching to the low fluence FL is made by the switching unit 88, one or more target layers are irradiated with the pulse laser beam 71 at the high fluence FH. After the switching to the low fluence FL, the target layers are processed sequentially by irradiating the target layers with the pulse laser beam 71 at the low fluence FL again. For example, when m target layers including the layer Lk are irradiated with the pulse laser beam 71 at the high fluence FH to remove the protrusions 20, and then the switching to the low fluence FL is made by the switching unit 88, as shown in FIG. 5B, (k+m)-th and subsequent target layers $L_{k+m}$, $L_{k+m+1}$, . . . are irradiated with the pulse laser beam 71 at the low fluence FL to sequentially process the target layers.

Figure 4C:
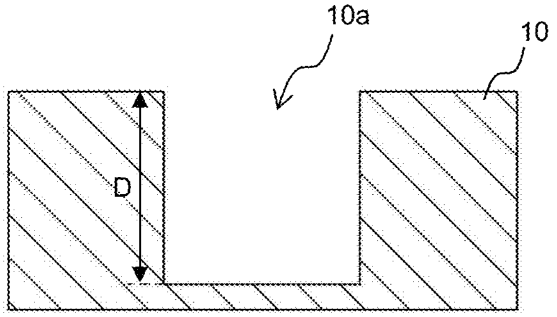
FIG. 4C is a cross-sectional view in which target layers of the workpiece 10 are processed by the laser processing device 1.

By repeating the above process through the n-th target layer $L_n$, the bottomed hole 10*a* with the desired depth D can be formed as shown in FIG. 4C. In this regard, in order to improve the precision of the processed surface of the bottomed hole 10*a*, it is preferable to perform the final processing (i.e., the processing of the portion including at least the n-th target layer $L_n$) by irradiation at the low fluence FL to complete the processing.

V. Advantageous Effects

In this embodiment, the control device 8 of the laser processing device 1 includes the switching unit 88 and the switching condition setting unit 86. Based on the switching condition set by the switching condition setting unit 86, the switching unit 88 switches the pulse laser beam 71 between the low fluence FL and the high fluence FH. When the protrusions 20 are generated on the target layers as the processing of the layers progresses using the irradiation at the low fluence FL, it is possible to remove the protrusions 20 by switching to the high fluence FH. After removing the protrusions 20, it is possible to switch to the low fluence FL and continue the processing of the target layers, thereby minimizing the processing of the target layers at the high fluence FH and reducing the precision of the processed surface due to the thermal effect on the material. In addition, since some layers of the target layers are irradiated with the pulse laser beam 71 at the high fluence FH, the total processing time is reduced compared to the case where the processing is performed only with the irradiation at the low fluence FL.

In addition, the laser processing device 1 includes the imaging device 91 for acquiring images of the target layers and the image processing device 92 for analyzing the images and detecting the protrusions 20, and the switching unit 88 switches the pulse laser beam 71 between the low fluence FL and the high fluence FH based on the detection result of the protrusions 20. Since the generation of the protrusions 20 can be monitored in real time, when the protrusions 20 are generated, the process can be immediately switched to high fluence FH to remove them and prevent the protrusions 20 from growing. In addition, after the removal of the protrusions 20 is completed, it is possible to immediately switch to the low fluence FL to suppress the thermal effect on the material.

VI. Other Embodiments

The present invention may also be implemented in the following manner.

Modification 1 and Modification 2

In the embodiment described above, the imaging device 91 acquires images of the target layers, the image is analyzed by the image processing device 92 to detect the protrusions 20, and the switching unit 88 switches the fluence of the pulse laser beam 71 by comparing the detection result of the protrusions 20 with the threshold value set by the switching condition setting unit 86. The configuration of the switching unit 88 and the switching condition setting unit 86 is not limited to this configuration, but may be configured in other ways.

In the modification 1, the switching condition setting unit 86 may be configured to set a numerical value NL representing the number of target layers to be processed at the low fluence FL and a numerical value NH representing the number of target layers to be processed at the high fluence FH as the switching condition, and the switching unit 88 may be configured to switch the pulse laser beam 71 from the low fluence FL to the high fluence FH based on the number NL of the target layers to be processed at the low fluence FL, and to switch the pulse laser beam 71 from the high fluence FH to the low fluence FL based on the number NH of the target layers to be processed at the high fluence FH. Specifically, after the laser processing device 1 starts the processing to irradiate the target layers with the pulse laser beam 71 at the low fluence FL, when the processing of the number NL of the target layers is completed, the switching unit 88 switches the pulse laser beam 71 from the low fluence FL to the high fluence FH. Furthermore, when the laser processing device 1 has processed the target layers using the pulse laser beam 71 at the high fluence FH and thereby the number of processed layers has reached the number NH, the switching unit 88 switches the pulse laser beam 71 from the high fluence FH to the low fluence FL. Thereafter, the processing of the NL target layers using the irradiation at the low fluence FL, and the processing of the NH target layers using the irradiation at the high fluence FH are repeated until the bottomed hole 10*a* having the desired depth D is formed.

In the modification 2, the switching condition setting unit 86 may be configured to set a low fluence processing depth DL and a high fluence processing depth DF as the switching condition, and the switching unit 88 may be configured to switch the pulse laser beam 71 from the low fluence FL to the high fluence FH based on the low fluence processing depth DL and to switch the pulse laser beam 71 from the high fluence FH to the low fluence FL based on the high fluence processing depth DF. Specifically, after the laser processing device 1 starts the processing to irradiate the target layers with the pulse laser beam 71 at the low fluence FL, when the processing of the target layers has progressed to the depth DL, the switching unit 88 switches the pulse laser beam 71 from the low fluence FL to the high fluence FH. Furthermore, when the laser processing device 1 has processed the target layers using the pulse laser beam 71 at the high fluence FH to the depth DF, the switching unit 88 switches the pulse laser beam 71 from the high fluence FH to the low fluence FL. Thereafter, the processing of the target layers to the depth DL using the irradiation at the low fluence FL and the processing of the target layers to the depth DH using the irradiation at the high fluence FH are repeated until the bottomed hole 10*a* with the desired depth D is formed.

Points of origin of the protrusions 20 are generated each time the processing of the target layers for a given depth, and the distribution of such points of origin in the depth direction differs depending on the material of the workpiece 10 which is the processing condition. Therefore, by performing an experimental processing for various materials as a preliminary investigation to investigate the distribution of the points of origin of the protrusions 20, it is possible to optimize each value of the number NL of the target layers to be processed at the low fluence, the number NH of the target layers to be processed at the high fluence, the low fluence processing depth DL, and the high fluence processing depth DF. In the above example, an optimal value of the number NL of the target layers to be processed at the low fluence and an optimal value of the number NH of the target layers to be processed at the high fluence optimized for each material, or an optimal value of the low fluence processing depth DL and an optimal value of the high fluence processing depth DF optimized for each material are stored in the memory unit 85 as a database or a numerical control program, and the switching condition setting unit 86 reads out each value corresponding to the material of the workpiece 10 included in the input information. This makes it possible to set the number NL of the target layers to be processed at the low fluence and the number NH of the target layers to be processed at the high fluence, or the low fluence processing depth DL and the high fluence processing depth DF.

The modification 1 and the modification 2 are configured to switch the fluence based on the number NL of the target layers to be processed at the low fluence and the number NH of the target layers to be processed at the high fluence, or the low fluence processing depth DL and the high fluence processing depth DF. In this configuration, it is possible to remove the generated protrusions 20 at a relatively early stage to avoid the growth of the protrusions 20 and to suppress the degradation of the precision of the processed surface due to the thermal effect on the material. In the above example, monitoring by the imaging device 91 and the image processing device 92 is not required during actual processing.

Modification 3

In the embodiment described above, each value of the low fluence FL and the high fluence FH is set to a fixed value in the processing to form the bottomed hole 10*a*. The setting of the low fluence FL and the high fluence FH is not limited to this, and two or more fluences may be set as the low fluence FL and the high fluence FH, respectively. For example, the irradiation device may be configured to perform irradiation with the pulse laser beam 71 at a first high fluence FH1 and a second high fluence FH2 which is lower than the first high fluence FH1, as the high fluence. The switching unit 88 may be configured to switch the pulse laser beam 71 output from the irradiation device among the low fluence FL, the first high fluence FH1, and the second high fluence FH2 based on the switching condition.

Specifically, the switching unit 88 switches the pulse laser beam 71 to the first high fluence FH1 when switching from the low fluence FL in order to remove the protrusions 20. After at least a part of the protrusions 20 is removed by irradiating the protrusions 20 with the pulse laser beam 71 at the first high fluence FH1, the pulse laser beam 71 is switched to the second high fluence FH2, which is lower than the first high fluence FH1, to completely remove the protrusions 20 by irradiating the protrusions 20 at the second high fluence FH2. In this regard, the switch from the first high fluence FH1 to the second high fluence FH2 may be performed based on the switching condition, and the switching condition may be set based on the number or the area of the protrusions 20 generated on the surface of the target layers. Alternatively, the switch to the second high fluence FH2 may be made when the processing at the first high fluence FH1 has progressed to a predetermined number of layers or a predetermined depth of the target layers.

In the modification 3, the high fluence FH is set at two levels, and the fluence is switched to the second high fluence FH2, which is relatively low, when at least a portion of the protrusions 20 have been removed. This makes it possible to efficiently remove the protrusions 20 while more effectively suppressing the thermal effect on the material of the workpiece 10.

Modification 4

Figure 7:
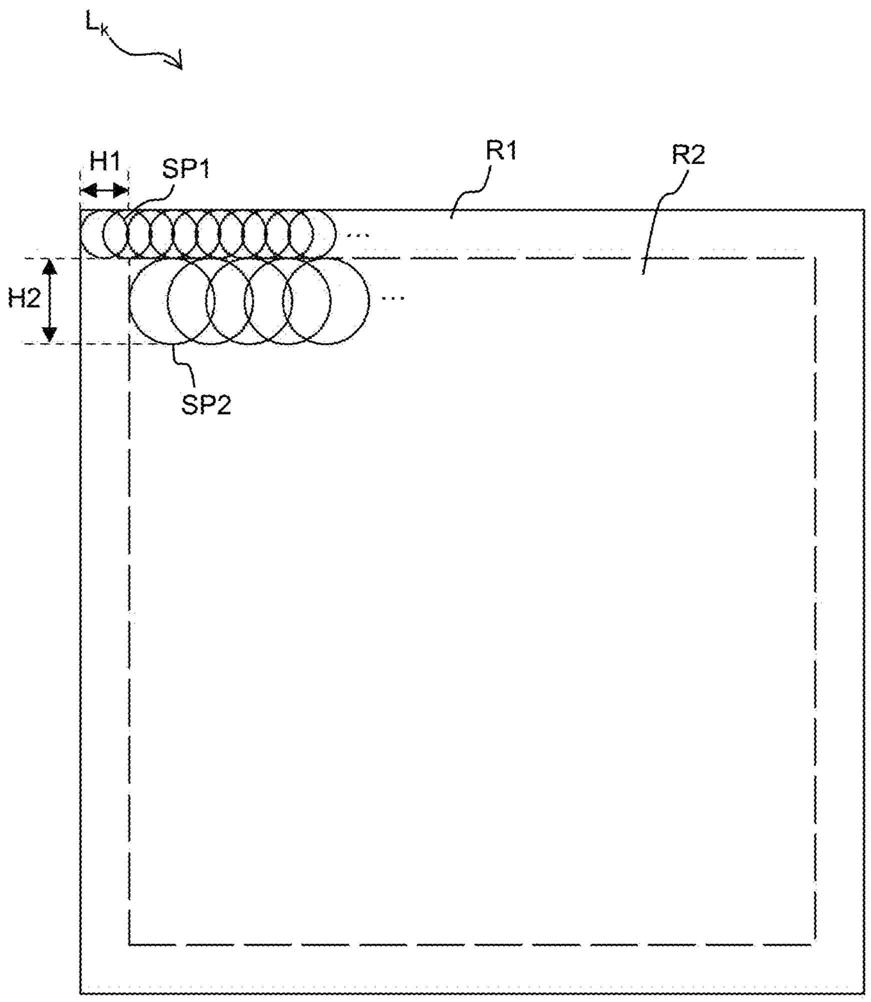
FIG. 7 is a diagram to describe irradiation of a pulse laser beam 71 in the modification 4.

When irradiating the same target layer with the pulse laser beam 71, a spot diameter of the pulse laser beam 71 may be varied. An irradiation manner of the modification 4 for irradiating the target layer $L_k$ shown in FIG. 7 with the pulse laser beam 71 is now described. The target layer $L_k$ includes a first region R1, which is a region adjacent to edges, and a second region R2, which is a different region from the first region R1. Specifically, a region along outer edges of the target layer Lk is defined as the first region R1, and a region located inward with respect to the first region R1 is defined as the second region R2. The control device 8 controls the laser processing device 1 so that when the irradiation with the pulse laser beam 71 is performed at the low fluence FL or the high fluence FH, a spot diameter H1 of an irradiation spot SP1 of the pulse laser beam 71 applied to the first region R1 becomes smaller than a spot diameter H2 of an irradiation spot SP2 of the pulse laser beam 71 applied to the second region R2. Here, in both of the irradiation at the high fluence FH and the irradiation at the low fluence FL, the pulse laser beam 71 applied to the first region R1 and the pulse laser beam 71 applied to the second region R2 are set to have equal fluence. The laser processing device 1 may be controlled so that the irradiation spot SP1 and the irradiation spot SP2 of the pulse laser beam 71 are overlapped at a boundary between the first region R1 and the second region R2.

For example, when irradiating the first region R1 with the pulse laser beam 71 at the low fluence FL, the control device 8 controls the optical system 3 or the condensing lens 52 to adjust the beam diameter to achieve the desired spot diameter H1, and controls the laser oscillator 2 to adjust the output pulse energy to set the pulse laser beam 71 at the low fluence FL. Furthermore, when irradiating the second region R2 with the pulse laser beam 71 at the low fluence FL, the control device 8 controls the optical system 3 or the condensing lens 52 to adjust the beam diameter to achieve the desired spot diameter H1 of the pulse laser beam 71, and controls the laser oscillator 2 to adjust the output pulse energy to set the pulse laser beam 71 at the low fluence FL.

In the modification 4, by irradiating the first region R1, which is adjacent to the edges, using the pulse laser beam 71 with a relatively small spot diameter H1, it is possible to process the edges of the target layer Lk, especially corners thereof, in high precision. On the other hand, by irradiating the second region R2, which is different from the first region R1, using the pulse laser beam 71 having a relatively large spot diameter H2, it is possible to improve the processing efficiency. In addition, since the first region R1 and the second region R2 are irradiated with the pulse laser beam 71 at the equal fluence, precision of the processed surface within the same layer Lk can be maintained at an approximately constant level.

Other Embodiments

While the formation of the bottomed hole is described as an example in the embodiment described above, the target shape by applying the laser processing method of the present invention is not limited thereto. Furthermore, the laser processing method of the present invention is also applicable, for example, to the formation of a groove shape and surface finishing. Here, the groove shape refers to a shape in which at least one of the four sides of a recess is open.

Furthermore, while the workpiece 10 made of alloy steel is processed in the embodiment described above, the material of the workpiece 10 to which the laser processing method of the present invention is applied is not limited thereto. For example, the laser processing method of the present invention is applicable to other metal materials such as carbon steel or resin materials.

In the embodiment described above, the fluence of the pulse laser beam 71 from one laser oscillator 2 is switched between the low fluence FL and the high fluence FH by changing the output pulse energy or the spot diameter. However, switching manner of the fluence is not limited to this. For example, two irradiation devices consisting of the laser oscillator 2, the optical system 3, and the scanning device 4 may be installed. In this case, a first pulse laser beam from one irradiation device is set at the low fluence FL and a second pulse laser beam from the other irradiation device is set at the high fluence FH. The fluence can be switched by switching the two irradiation devices by the irradiation control unit 83.

EXAMPLE

Hereinafter, the details of the present invention will be described using examples. The present invention is not limited to the following examples.

Using the laser processing device 1, the ultrashort pulse laser processing was performed for the workpiece 10 to form the bottomed hole 10*a*, and the condition of the processed surface of the bottomed hole 10*a* was observed. In Example 1, the workpiece 10 made of SUS304 is irradiated with the pulse laser beam 71 (wavelength: 515 [nm], frequency: 200 [kHz]) having a pulse width of 410 [fs] by raster scanning at the scanning speed of 500 [mm/s], spot diameter of 9 [μm], spot spacing of 2.5 [μm], and line spacing 2.5 [μm]. Here, the line spacing refers to the distance between the centers of two adjacent irradiation spots in the horizontal one-axis direction orthogonal to the scanning direction of the pulse laser beam 71 in raster scanning.

The low fluence FL was set to 0.63 [J/cm$^2$], the processing depth per target layer was set to 0.36 [μm] in the irradiation at the low fluence FL, and the target layers were sequentially processed by the irradiation with the pulse laser beam 71. The high fluence FH was set to 6.3 [J/cm$^2$], the processing depth per target layer was set to 1.5 [μm] in the irradiation at the high fluence FH, and the protrusions 20 on the target layers are removed by the irradiation with the pulse laser beam 71. The number NL of the target layers to be processed at the low fluence was set to 50 and the number NH of the target layers to be processed at the high fluence was set to 5. Based on the number NL of the target layers to be processed at the low fluence and the number NH of the target layers to be processed at the high fluence, the processing of the target layers was repeated while the fluence of the pulse laser beam 71 was switched between the low fluence FL and the high fluence FH by the switching unit 88. The 50 layers constituting the lowest part of the bottomed hole 10*a* were processed by irradiation at the low fluence FL to complete the processing. Consequently, the bottomed hole 10*a* having a substantially square opening of 1000×1000 [μm] in a plan view and the depth of 481 [μm] was obtained.

In Comparative Example 1, irradiation at the high fluence FH was not performed, and the processing was performed by irradiation with the pulse laser beam 71 only at the low fluence FL. The low fluence FL was set to 0.63 [J/cm$^2$], the processing depth per layer was set to 0.36 [μm], and the target layers were sequentially processed by the irradiation with the pulse laser beam 71. The other conditions were set in the same way as in Example 1. The bottomed hole 10*a* having a substantially square opening of 1000×1000 [μm] and the depth of 477 [μm] was obtained.

In Comparative Example 2, irradiation at the low fluence FL was not performed, and the processing was performed by irradiation with the pulse laser beam 71 only at the high fluence FH. The high fluence FH was set to 6.3 [J/cm$^2$], the processing depth per layer was set to 1.5 [μm], and the target layers were sequentially processed by the irradiation with the pulse laser beam 71. The other conditions were set in the same way as in Example 1. The processing was completed by performing only the high fluence step, and the bottomed hole 10*a* having a substantially square opening of 1000×1000 [μm] and the depth of 468 [μm] was obtained.

Figure 8A:
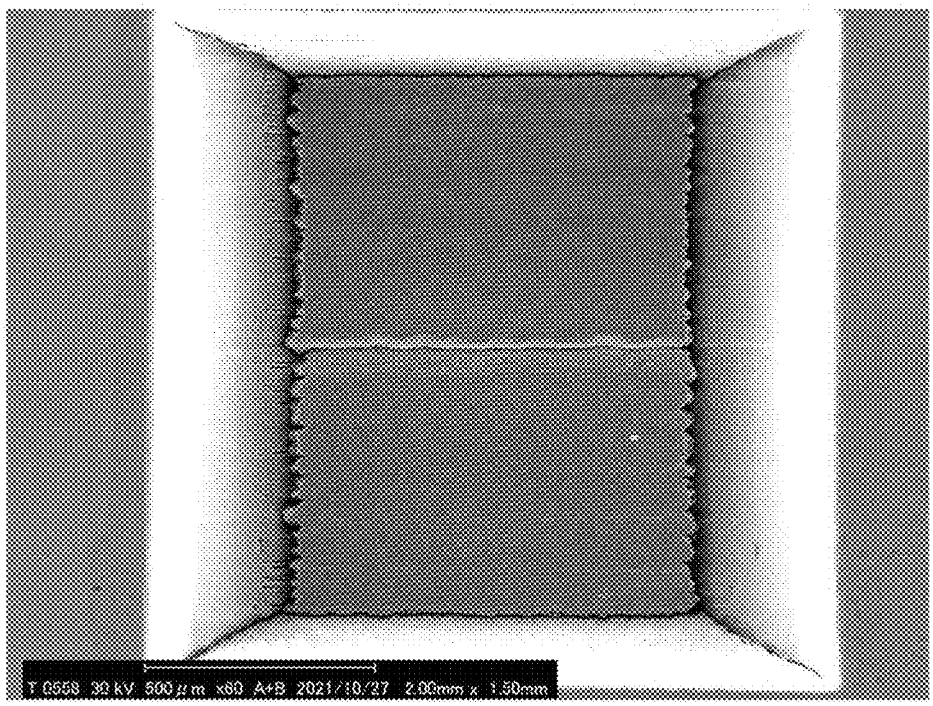
FIG. 8A is an image of a processed surface of a bottomed hole 10*a* formed in Example 1 and was obtained by imaging the bottomed hole 10*a* from above.
Figure 8B:
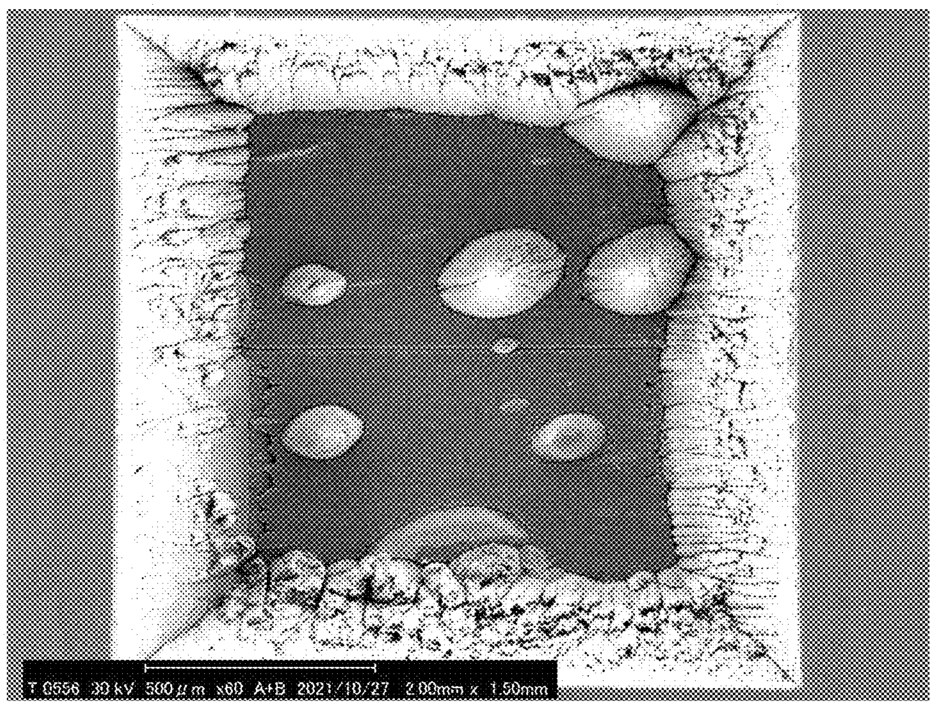
FIG. 8B is an image of a processed surface of the bottomed hole 10*a* formed in Comparative Example 1 and was obtained by imaging the bottomed hole 10*a* from above.

FIG. 8A and FIG. 8B are images of the processed surface of the bottomed hole 10*a* in Example 1 and Comparative Example 1, respectively and were obtained by imaging the bottomed hole 10*a* from above. In the bottomed hole 10*a* of Example 1, only a few protrusions 20 were observed on a bottom and side surfaces. The arithmetic average roughness Ra, which is an index of surface roughness, of the processed surface was approximately 0.13 μm, and a relatively high-precision processed surface was obtained. In this regard, the arithmetic average roughness Ra was measured in accordance with JIS B 0601-2001. On the other hand, in the bottomed hole 10*a* of Comparative Example 1, a large number of protrusions 20 were observed on the bottom and side surfaces, and the arithmetic average roughness Ra of the processed surface was approximately 2.0 μm.

Figure 9A:
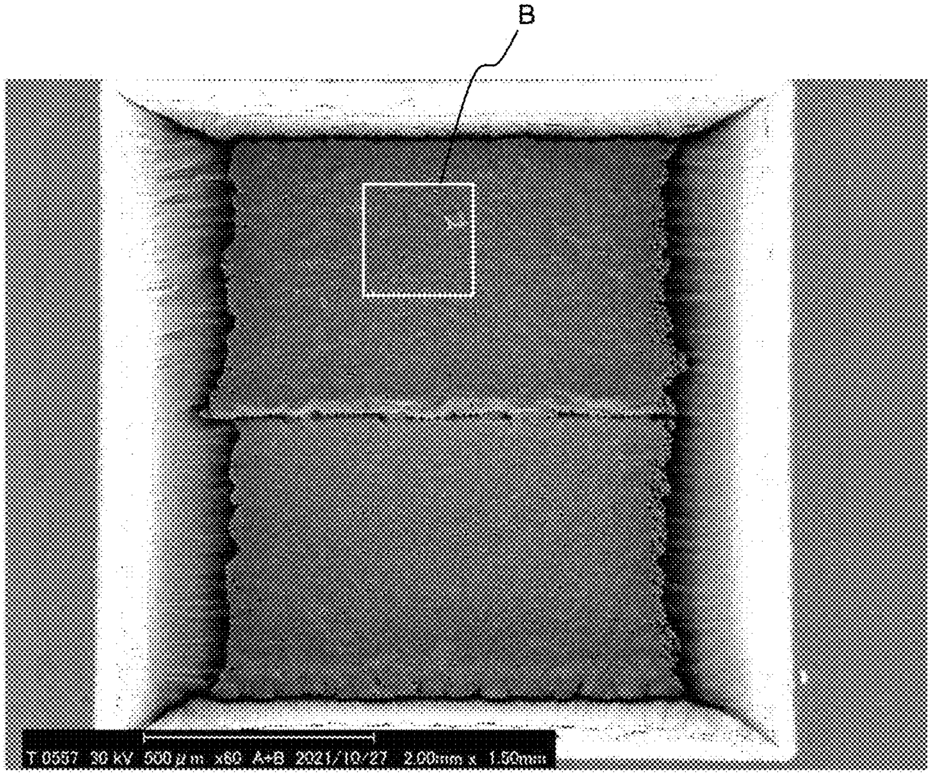
FIG. 9A is an image of a processed surface of the bottomed hole 10*a* formed in Comparative Example 2 and was obtained by imaging the bottomed hole 10*a* from above.
Figure 9B:
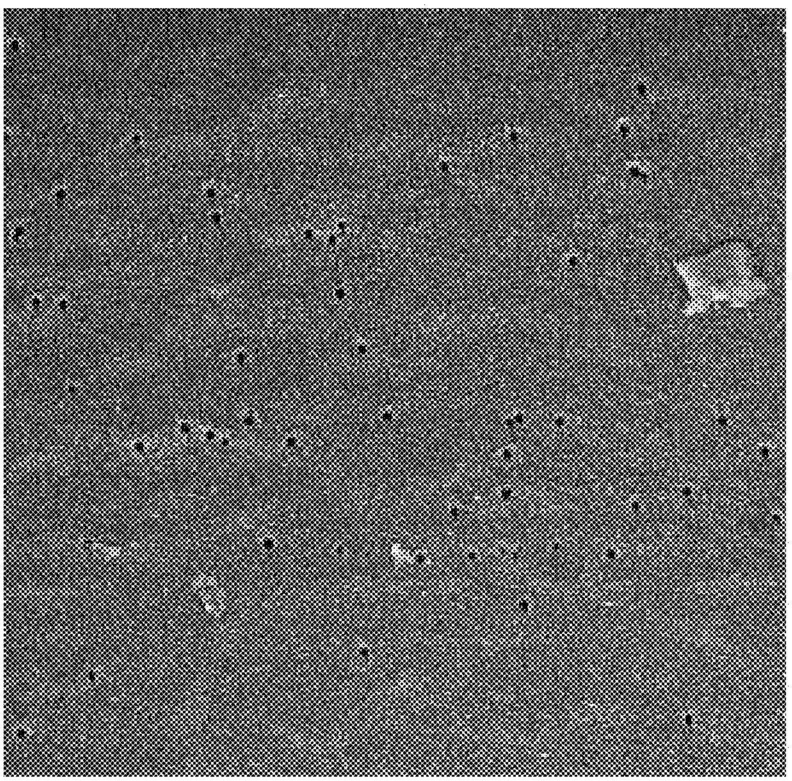
FIG. 9B is an enlarged image of a region B in FIG. 9A.

FIG. 9A is an image of the processed surface of the bottomed hole 10*a* formed in Comparative Example 2 and was obtained by imaging the bottomed hole 10*a* from above. FIG. 9B is an enlarged image of a region B in FIG. 9A. In the bottomed hole 10*a* of Comparative Example 2, almost no protrusions 20 were observed on the bottom and side surfaces. However, a large number of micropores caused by thermal influence were observed on the processed surface, and the arithmetic average roughness Ra of the processed surface was approximately 0.26 μm.

Various embodiments according to the present invention have been described above, and these are presented as examples and are not intended to limit the scope of the invention. The novel embodiment can be implemented in various other forms, and various omissions, replacements, and changes can be made without departing from the gist of the invention. The embodiment and its modifications are included in the scope and gist of the invention and are included in the scope of the invention described in the claims and the equivalent scope thereof.

REFERENCE SIGNS LIST

1: laser processing device
2: laser oscillator
3: optical system
4: scanning device
8: control device
10: workpiece
10*a*: bottomed hole
20: protrusion
41: first galvanometer mirror
42: second galvanometer mirror
51: beam splitter
52: condensing lens
53: imaging lens
71: pulse laser beam
72: reflected light
81: input unit
82: numerical control unit
83: irradiation control unit
84: arithmetic unit
85: memory unit
86: switching condition setting unit
87: fluence setting unit
88: switching unit
91: imaging device
92: image processing device
93: CAD device
94: CAM device

The invention claimed is:

1. A laser processing device, comprising:

an irradiation device comprising a laser oscillator and a scanning device, wherein the scanning device further comprising a first galvanometer mirror with a first actuator, and a second galvanometer mirror with a second actuator; and a control device including a controller comprising one or more processors, wherein the irradiation device is configured to sequentially process one or more target layers in a workpiece by irradiating the target layers with a pulse laser beam having a pulse width of less than 10 picoseconds at a predetermined low fluence, and to remove a protrusion generated on a surface of the target layers by irradiating the protrusion with the pulse laser beam at a high fluence higher than the low fluence, the control device includes a switching unit and a switching condition setting unit, the switching unit switches fluence of the pulse laser beam from the irradiation device between the low fluence and the high fluence based on a switching condition, the switching condition setting unit sets the switching condition based on condition of the workpiece, and sets the number of target layers to be processed at the low fluence and the number of target layers to be processed at the high fluence as the switching condition, and the switching unit switches the pulse laser beam from the low fluence to the high fluence based on the number of the target layers to be processed at the low fluence, and switches the pulse laser beam from the high fluence to the low fluence based on the number of the target layers to be processed at the high fluence.

2. The laser processing device of claim 1, further comprising:

an imaging device including a camera configured to acquire an image of the target layers; and an image processing device comprising one or more processors configured to analyze the image to detect the protrusion on the surface of the target layers, wherein the switching unit switches the pulse laser beam between the low fluence and the high fluence based on a detection result of the protrusion.

3. The laser processing device of claim 2, wherein the image processing device analyzes the image to acquire area or the number of the protrusion on the surface of the target layers.

4. The laser processing device of claim 1, wherein the switching condition setting unit sets a low fluence processing depth and a high fluence processing depth as the switching condition, and the switching unit switches the pulse laser beam from the low fluence to the high fluence based on the low fluence processing depth and switches the pulse laser beam from the high fluence to the low fluence based on the high fluence processing depth.

5. The laser processing device of claim 1, wherein the irradiation device is configured to perform irradiation with the pulse laser beam at a first high fluence and at a second high fluence as the high fluence, the second high fluence being lower than the first high fluence, and the switching unit is configured to switch the fluence of the pulse laser beam from the irradiation device between the low fluence, the first high fluence, and the second high fluence based on the switching condition.

6. The laser processing device of claim 1, wherein the control device includes a fluence setting unit, the fluence setting unit sets each value of the high fluence and the low fluence based on a processing condition, and the processing condition includes material of the workpiece.

7. The laser processing device of claim 6, wherein the processing condition further includes a scanning speed and a repetition frequency of the pulse laser beam.

8. The laser processing device of claim 1, wherein each of the target layers includes a first region and a second region, the first region being a region adjacent to an edge of the target layers, the second region being a different region from the first region, a spot diameter of the pulse laser beam applied to the first region is smaller than a spot diameter of the pulse laser beam applied to the second region, and the pulse laser beam applied to the first region and the pulse laser beam applied to the second region are set to have equal fluence.

9. The laser processing device of claim 1, wherein the target layers are formed of alloy steel containing an inclusion in a base material, and the high fluence is equal to or greater than a laser ablation threshold value of the inclusion.

10. The laser processing device of claim 1, wherein the irradiation device includes a laser oscillator, and the laser processing device is configured to switch the fluence of the pulse laser beam between the low fluence and the high fluence by changing output pulse energy of the laser oscillator.

11. The laser processing device of claim 1, wherein the laser processing device is configured to switch the fluence of the pulse laser beam between the low fluence and the high fluence by changing a spot diameter of the pulse laser beam.

* * * * *